Sept. 12, 1933.     C. C. KRITZER     1,926,392
MOUNTING
Filed June 22, 1931
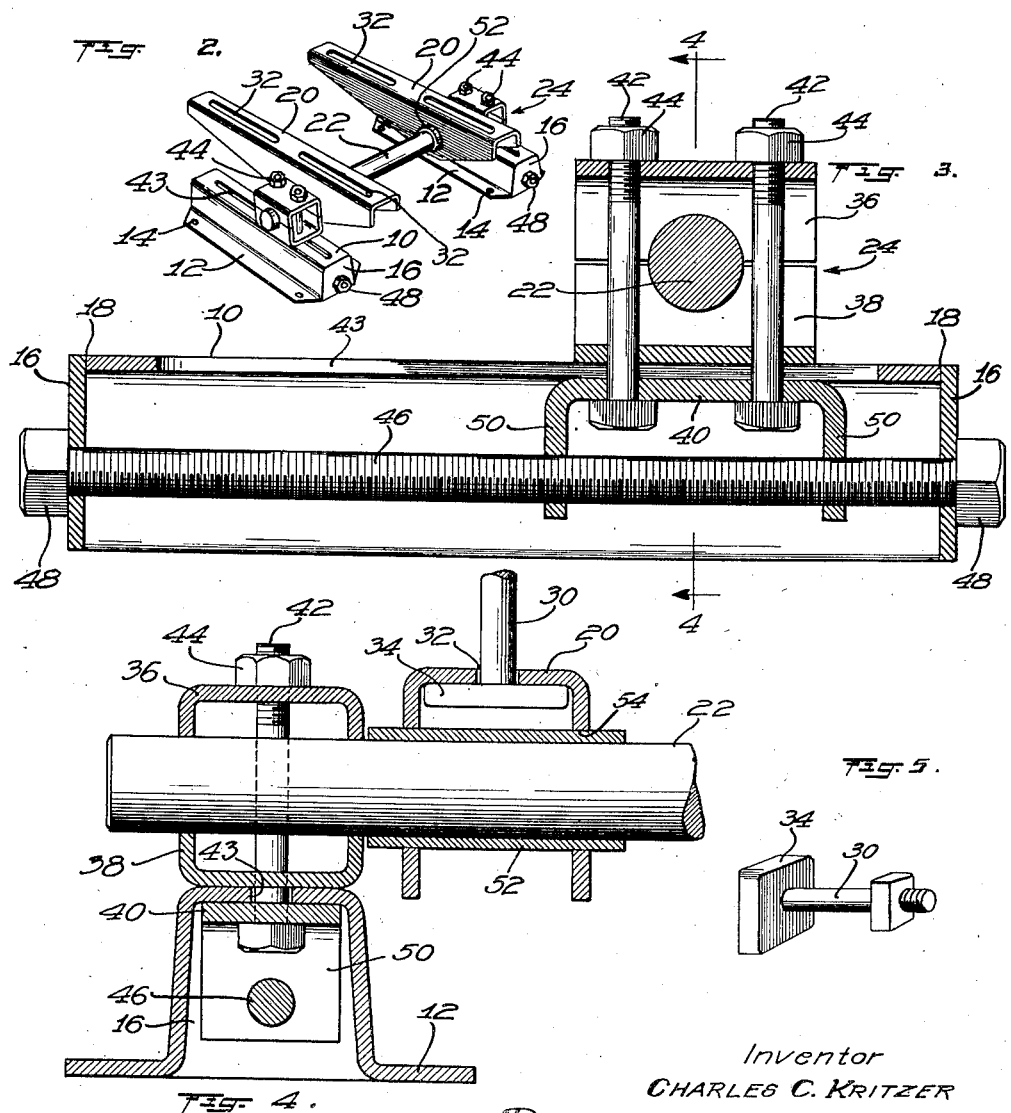
Inventor
CHARLES C. KRITZER
By Freeman and Sweet
Attorneys Patented Sept. 12, 1933

1,926,392

UNITED STATES PATENT OFFICE 1,926,392

MOUNTING

Charles C. Kritzer, Chicago, Ill.

Application June 22, 1931. Serial No. 546,013

6 Claims. (Cl. 308—11)

My invention relates to dynamo-electric machinery and includes among its objects and advantages, an improvement in supports for such machinery.

In the accompanying drawing:

Figure 1 is a diagrammatic view of my support having a motor mounted thereon;

Figure 2 is a perspective view of the support;

Figure 3 is a longitudinal sectional view of one of the rails;

Figure 4 is a sectional view along the line 4—4 of Figure 3; and

Figure 5 is a perspective view of one of the clamp bolts.

In the embodiment selected to illustrate my invention, I make use of two spaced bases 10 which are U-shaped in cross section and provided with flanges 12 having openings 14 therein, securing them on a floor or other supporting structure by fastening bolts or screws. The bases are shaped from sheet material and have their ends closed by means of plates 16 welded in place around their edges as at 18.

A pair of motor supporting arms 20 are pivotally mounted upon a shaft 22 firmly assembled with the bases 10 through the medium of clamps 24. In Figure 1, I have shown a motor 26 mounted upon the arms 20. The feet 28 of the motor are secured to the arms 20 by means of bolts 30 which pass through slots 32 in the arms. The arms are U-shaped in cross section with the bight uppermost and shaped from sheet material. In Figure 5, I have shown a detailed view of one of the bolts 30. One end of the bolt is provided with a rectangular head 34 which is disposed within the arms 20 and prevents rotation of the bolts.

Each clamp 24 comprises an upper member 36 overlying the shaft 22, a middle member 38 below the shaft 22 and riding on one of the bases 10, and a bottom member 40 having engagement with a downwardly facing surface of the base 10 as by being housed inside it. Clamp bolts 42 connected with the bottom member 40 pass through a slot 43 in base 10 and through openings in the members 36 and 38. The clamp bolts 42 are welded at their lower ends to the bottom clamp member 40, and by tightening the nuts 44 all three members together with the base and shaft are clamped rigidly together.

Means are provided for adjusting each clamp 24 longitudinally on its base when the nuts 44 are loosened. I have illustrated a threaded shaft 46 housed inside the base 10 with heads 48 at both ends welded to its ends and abutting the outer surfaces of the end pieces 16. The clamp includes threaded means projecting down to engage the shaft 46. I have illustrated end pieces 50 bent down from opposite ends of the bottom clamping 40.

A bronze bushing 52 is associated with each of the arms 20. The bushings provide bearings for mounting the arms upon the shaft 22 as shown in Figures 2 and 4. The bushings are pressed into openings 54 in the sides of the arms.

The complete accommodation of a motor installation to all the conditions of operation involves a variation in the position of the motor that will give the belt the elongation it should have, depending on its length and other properties, regardless of the weight of the motor employed to drive it. It also requires reasonably perfect alignment or parallelism between the axes of the driving and driven pulleys.

One satisfactory procedure for assembling a device according to the invention is as follows: The motor is first clamped on the arms at such a point that the unbalanced weight available for the position of Figure 1 will be that best suited for the particular belt used. The shaft 22 is positioned near the slack end of the adjustment range provided with respect to the bases 10. The length of the belt or the positioning of the bases 10 must still be open for determination at this time. Assuming that the bases 10 are already mounted in place, the belt is cut or selected to be of substantially the right length and put in place. The clamps may now be adjusted to bring the motor to the position of Figure 1. Starting the motor will indicate the alignment of the motor shaft by the way the belt runs, and individual clamp adjustments can be made to make the belt run perfectly. Then both clamps may be fastened by tightening the nuts 44 and the assembly is ready for operation.

From time to time as tension elongates the belt, readjustments may be made when power is turned off to bring the motor back to the position of Figure 1.

When the motor is standing still the reaches of the belt both carry the same tension. When the motor is running the increase in tension on the tight side and the decrease in tension on the slack side changes the effective leverage of the belt with respect to the pivot 22, and this action may be made to effect an advantageous variation in belt tension as a function of load, by arranging the installation so that the torque of the motor puts the additional tension in the reach nearest the pivot.

The adjustment of the motor on the arms 20 and the adjustment of the shaft 22 together make it possible to secure correct operating conditions for motors, pulleys, and belts of various weights and sizes.

Without further elaboration, the foregoing will so fully explain my invention that others may, by applying knowledge current at the time of application, readily adapt the same for use under various conditions of service.

I claim:

1. In a motor support, rails, a transverse shaft, clamp means for supporting said shaft comprising three members, an upper member for pressing down on said shaft, a lower member for pressing up on said rail, and an intermediate member pressed down on said rail; means for drawing all three members simultaneously into clamping relation; said lower member having turned down ends; and means carried by said rails engaging said turned down ends for adjusting said clamp longitudinally of the rail.

2. In a motor mounting, a hollow base member having a slot in its top, a supporting shaft, a pair of clamp members recessed to receive said supporting shaft and mounted upon said base member, said clamp members having openings, a third clamp member positioned in said base member and bearing against the under side of its top, a pair of bolts fastened to said third clamp member and extending through said slot and said openings, so that tightening of said bolts will draw all said clamp members into rigid assembly and fixed relation to said base member.

3. In a motor mounting, a hollow base member having a slot in its top, a supporting shaft, a pair of clamp members recessed to receive said supporting shaft and mounted upon said base member, said clamp members having openings, a third clamp member positioned in said base member and bearing against the under side of its top, a pair of bolts fastened to said third clamp member and extending through said slot and said openings, so that tightening of said bolts will draw all said clamp members into rigid assembly and fixed relation to said base member, said third clamp member having threaded openings, and an adjusting screw rotatably connected with said base member and passing through said threaded openings, to permit shifting of said clamp parts and the supporting shaft longitudinally of the adjusting screw when said bolts are loosened.

4. In a motor mounting, a pair of hollow base members having slots in their tops, a supporting shaft, a pair of clamp members recessed to receive said supporting shaft and mounted upon each of said base members, said clamp members having openings, a third clamp member positioned in each of said base members and bearing against the top part of its respective base member, a pair of bolts fastened to each of said third clamp members and extending through said slots and the openings in said clamp parts, so that tightening of said bolts will draw all said clamp parts into rigid assembly and fixed relation to said base members, said third clamp members having threaded openings, and adjusting screws rotatably connected with said base members and passing through said threaded openings, to permit shifting of said clamp parts and the supporting shaft longitudinally of the adjusting screws when said bolts are loosened.

5. In a motor mounting, a base member having a slot, a shaft, a pair of clamp members to support said shaft and mounted upon said base member, said clamp members having openings, a third clamp member positioned under said base member, bolts fastened to said third clamp member and extending through said slot and the openings in said clamp members, so that tightening of said bolts will draw all said clamp members into rigid assembly and fixed relation to said base member.

6. In a motor mounting, a base member having a slot, a shaft, a pair of clamp members to support said shaft and mounted upon said base member, a third clamp member positioned under said base member, bolts fastened to said third clamp member and extending through said slot and into clamping relation with the other of said clamp parts, so that tightening of said bolts will draw all said clamp parts into rigid assembly and fixed relation to said base member, said third clamp member having threaded openings, and an adjusting screw rotatably connected with said base and passing through said threaded openings, to permit shifting of said clamp members and the supporting shaft longitudinally of the adjusting screw when said bolts are loosened.

CHARLES C. KRITZER.